United States Patent [19]

Waggoner

[11] Patent Number: 5,164,784
[45] Date of Patent: Nov. 17, 1992

[54] CW DOPPLER LIDAR

[75] Inventor: Alan P. Waggoner, Seattle, Wash.

[73] Assignee: The Boeing Company, Seattle, Wash.

[21] Appl. No.: 822,290

[22] Filed: Jan. 17, 1992

[51] Int. Cl.$^5$ .............................................. G01P 3/36
[52] U.S. Cl. ...................................... 356/28.5; 356/28
[58] Field of Search .................................. 356/28, 28.5

[56] References Cited

U.S. PATENT DOCUMENTS

| | | | |
|---|---|---|---|
| 3,830,568 | 8/1974 | Allen | 356/28 |
| 3,915,686 | 10/1975 | Miller | 71/79 |
| 3,984,686 | 10/1976 | Fletcher et al. | 250/339 |
| 4,167,329 | 9/1979 | Jelalian et al. | 356/5 |
| 4,249,244 | 2/1981 | Shofner et al. | 364/525 |
| 4,397,549 | 8/1983 | Morgan | 356/5 |
| 4,537,503 | 8/1985 | Liu | 356/28.5 |
| 4,572,664 | 2/1986 | Hanson | 356/28.5 |
| 4,589,070 | 5/1986 | Kyrazis | 364/424 |
| 4,715,707 | 12/1987 | Reynolds | 356/28.5 |
| 4,859,055 | 8/1989 | Gal | 356/28 |

Primary Examiner—Mark Hellner
Attorney, Agent, or Firm—Christensen, O'Connor, Johnson & Kindness

[57] ABSTRACT

A continuous wave Doppler LIDAR with an enhanced signal-to-noise ratio (SNR) that greatly enhances its ability to determine relative fluid velocity. A laser source (12, 50, 102) produces coherent light that is split between a reference beam and a test beam by a beam splitter (16, 106). A quarter-wavelength plate (26, 108) changes the linear polarization of the test beam to a circular polarization. The circularly polarized test beam is focused on a target cell (30) having a very small volume. Any particle in a fluid moving relative to the CW Doppler LIDAR system that passes through the target cell causes a Doppler shift in the frequency of the coherent light reflected from the particle and reverses the rotational direction of circular polarization of the reflected beam. The light reflected from the particle is combined with the reference beam, creating an interference pattern (or difference signal) incident on a photodetector (44, 118). A level detection trigger signal is developed from a corresponding electrical signal produced by the photodetector in response to this difference signal. This level detection trigger signal is used to enable fast Fourier transform processing of the electrical signal only when a particle is within the target cell. The enhanced SNR resulting from the relatively high ratio of the volume per particle to the sensed volume of the target cell thus is not averaged with the low SNR evident when a particle is not in the sensed volume. Consequently, the enhanced SNR provides a much more robust measurement of the particle's relative velocity (and thus the relative fluid velocity) as a function of the Doppler frequency shift in the reflected coherent light caused by the particle as it passes through the target cell.

16 Claims, 6 Drawing Sheets

CW DOPPLER LIDAR

FIELD OF THE INVENTION

This invention generally pertains to a coherent, continuous wave (CW) LIDAR system that is used to measure velocity and a method for measuring the relative velocity of a fluid using such a system, and more specifically, to a LIDAR system and method used to measure relative air velocity as a function of a Doppler shift in the frequency of light reflected from aerosol particles in the fluid.

BACKGROUND OF THE INVENTION

Radar is often used to determine the relative velocity of a target with respect to a fixed or moving radar antenna. One technique used to measure the relative closing velocity of a target analyzes the Doppler shift that the target's velocity produces in the frequency of a reflected radar signal. If the target is approaching the radar antenna, its relative closing velocity causes an apparent decrease in the reflected radar signal wavelength, thus Doppler shifting the reflected signal to a higher frequency. Conversely, if the target's velocity is directed away from the radar antenna, the Doppler shift decreases the frequency of the reflected radar signal.

CW LIDAR is used in a manner analogous to radar, but in a more microscopic sense, to measure relative wind velocity as a function of a Doppler shift in the frequency of coherent light reflected from aerosol particles in an airstream. If the aerosol particles and the air in which they entrained have a relative velocity toward the source of coherent light, the light reflected from the aerosol particles experiences an increase in frequency, and conversely, a decrease in frequency with regard to air/particles moving away from the source of the coherent light with a relative velocity. However, there are several problems with conventional LIDAR systems that limit their usefulness and practical application in determining airstream velocity. Since the coherent light is simultaneously reflected from a plurality of aerosol particles moving through a relatively large volume of space, large fluctuations in signal intensity occur at the detector used to monitor the reflected light, due to interference between the reflected light signals. This problem is known as "speckle".

A more significant limitation in the performance of prior art CW LIDAR systems concerns their poor signal-to-noise ratio (SNR). As CW LIDAR is normally implemented to monitor airstream velocity, the SNR is independent of the optical aperture or diameter of the lens used to collimate the coherent light and also independent of the range from the lens to the aerosol targets, because any decrease in signal strength with range is offset by a corresponding increase in the number of aerosol particles that scatter or reflect the coherent light within the sample volume. For example, assuming that there are sufficient aerosol particles in the sample space to produce a generally constant optical backscatter coefficient, $\beta$, of $1 \times 10^{-7}$, a 1 micrometer wavelength laser having a 1 watt power rating would have an SNR defined by:

$$SNR = (\eta \cdot 2\pi \cdot \lambda^2 \cdot \beta \cdot P_l)/(h \cdot c \cdot B) \quad (1)$$

where:

$\eta = 0.05$ (QE•T$^2$ efficiency factor)

$2\pi = 6.28$
$\lambda = 10^{-6}$
$\beta = 10^{-7}$ m$^{-1}$sr$^{-1}$
$P_l = 1$ watt
$h = 6.6 \times 10^{-34}$ Js
$c = 3 \times 10^8$ m/s
$B = 2 \times 10^5$ Hz (bandwidth)

Using the above values, an SNR of 0.8 is obtained, which is too low for use in a practical system. To achieve any usable results, prior art CW LIDAR systems have used higher power $CO_2$ lasers. It should be apparent that laser diodes and diode pumped YAG lasers would be a preferable light source for many applications of CW LIDAR systems because of the ruggedness, small size, and potential low cost of these devices; however, laser diodes and diode-pumped lasers are generally not yet available at CW power levels above a few hundred milliwatts and, thus, can not be used as a source of coherent light in CW LIDAR systems of the prior art design.

Accordingly, a CW LIDAR system having much higher SNR is required for practical use in measuring the relative velocity of air or other fluids containing particles. Such a system and corresponding method for measuring the relative velocity of a fluid should be low in cost and capable of using a low-power coherent light source. These and other objects and advantages of the present invention will be apparent from the attached drawings and from the Description of the Preferred Embodiments that follows.

SUMMARY OF THE INVENTION

In accordance with this invention, apparatus for sensing a relative velocity of a fluid containing aerosol particles comprise means for producing coherent light, including a test beam and a reference beam. A lens is used to focus the test beam on a region of space comprising a detection cell having a volume sufficiently small to contain zero or one aerosol particle. During most of the time, the detection cell contains zero aerosol particles. Any aerosol particles passing through the detection cell scatter the coherent light as a reflected beam, generally back along a path over which the test beam propagated toward the detection cell; however, the reflected beam can have a different frequency than the test beam, due to a Doppler shift caused by the relative velocity of the aerosol particle. Also provided are means for combining the reflected beam with the reference beam so that they interfere with each other. A coherent detector monitors the intensity of the combined reference beam and reflected beam, producing a corresponding electrical signal. Processing means process the electrical signal to determine the frequency change of the reflected light caused by the Doppler shift, and as a function thereof, determine the relative velocity of the aerosol particle and of the fluid.

The means for producing coherent light comprise a laser and a splitter, the splitter being disposed in an optical path so as to intercept coherent light output from the laser, directing a portion along a different optical path to form the reference beam. Also included in one embodiment of the apparatus are means for shifting the frequency of the test beam to a first value and for shifting the frequency of the reference beam to a second value, different from the first value.

One preferred form of the invention also includes means for modifying a polarization characteristic of the reference beam so that it is the same as that of the reflected test beam.

The lens is configured to focus the test beam so that the volume of the detection cell is substantially less than an average volume per aerosol particle of the fluid, thereby insuring that the test beam is generally scattered by only one aerosol particle at a time to form the reflected beam.

In the preferred form of the invention, the means for combining the reflected beam with the reference beam comprise a beam splitter that substantially transmits one of the reference beam and the reflected beam, but substantially reflects the other of the reference beam and the reflected beam, so that said beams are directed along a common path.

The processing means comprise an analog-to-digital (A-D) convertor that digitizes the electrical signal produced by the coherent detector, producing a digitized signal corresponding thereto. In addition, the processing means comprise level detection means for controlling the processing of the electrical signal, inhibiting the processing when a level of the electrical signal is below a predetermined value, i.e., when one of the aerosol particles is not reflecting the test beam. A Fourier transform circuit is connected to convert the digitized signal from a time domain to a frequency domain. The output of the Fourier transform circuit thus represents the energy of the digitized signal as a function of its frequency. Scattering of the test beam by one of the particles produces an energy peak as a function of the frequency of the Doppler shift caused by the aerosol particle. This frequency is then used to determine the relative velocity of the aerosol particle and the fluid.

Another aspect of the present invention is a method for measuring a relative velocity in respect to a fluid containing aerosol particles. The steps of the method are generally consistent with the functions performed by the elements of the apparatus described above.

DETAILED DESCRIPTION OF THE PREFERRED EMBODIMENTS

Figure 1:
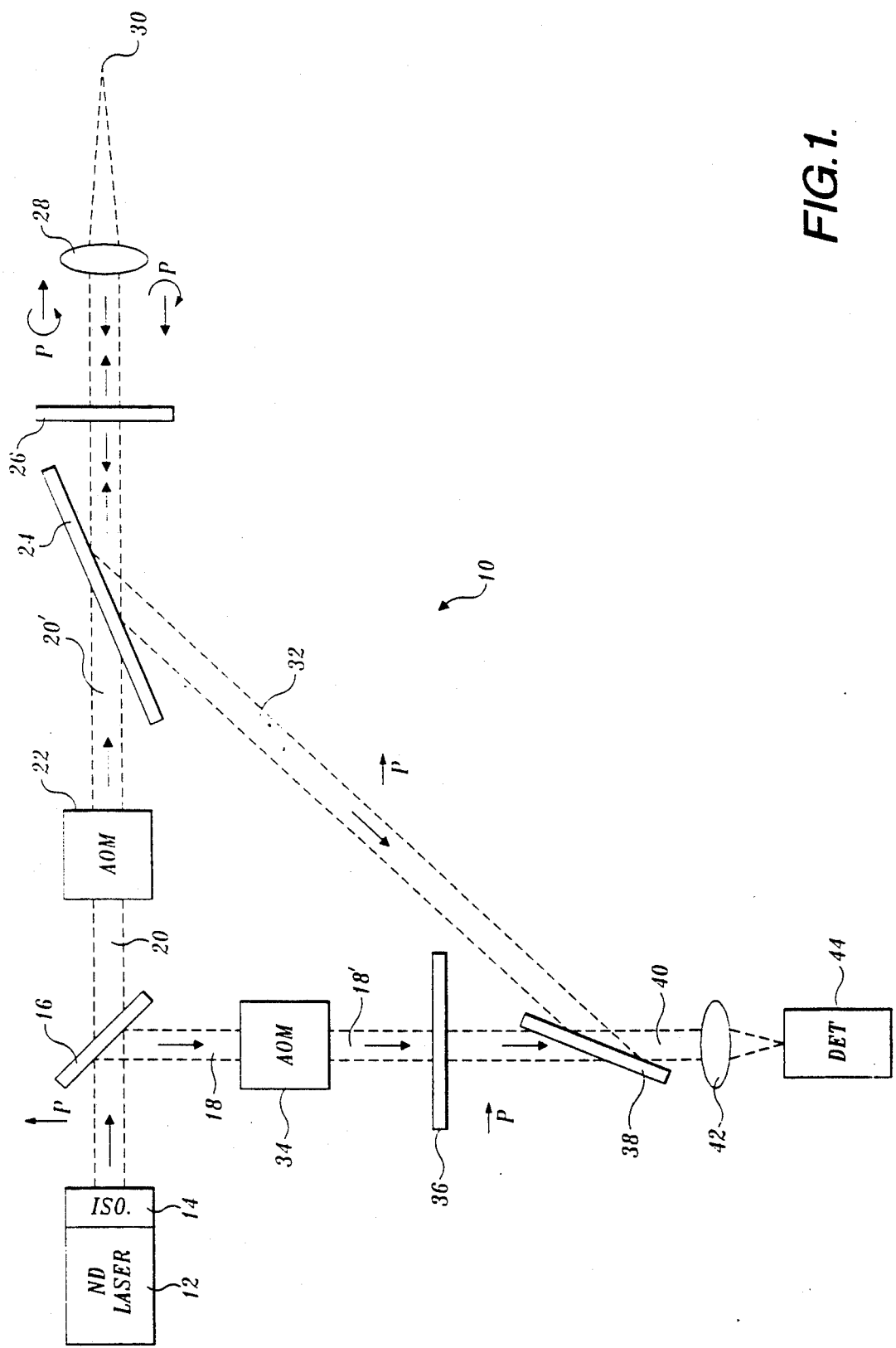
FIG. 1 is a schematic diagram showing a CW Doppler LIDAR system for measuring relative fluid velocity, in accordance with the present invention.

A first embodiment of a CW Doppler LIDAR system is shown generally at reference numeral 10 in FIG. 1. System 10 includes a neodymium (Nd) laser 12 having a wavelength of approximately 1.06 micrometers, which is used as the source of coherent light to determine the relative velocity of a fluid. Preferably laser 12 has an output power level of from 0.03 to 0.3 watts and a coherence length of about 10 centimeters. Other lasers could be used for this application, so long as they emit a linearly polarized light that has a relatively long coherence length, i.e., light with a narrow range of optical frequencies or wavelengths in its output so that light from the laser travelling over two paths of somewhat different lengths interfere when combined together. An optical isolator 14 is preferably included at the outlet aperture of laser 12 to prevent reflected light from re-entering the laser. The coherent light exiting isolator 14 is directed toward a beam splitter 16 that divides the light into two beams, including a reference beam 18 and a test beam 20. Beam splitter 16 is designed to transmit most of the light emitted by laser 12, reflecting, for example, only 1% of its energy to form reference beam 18. The other 99% of the light energy comprises test beam 20.

An acoustic optical modulator (AOM) 22 shifts the frequency of test beam 20 by a predefined value, $\Delta F_1$, incidentally also producing a small angular shift in the direction with which the light exits AOM 22 as test beam 20' (the angular shift is not evident in the figure). The frequency shift introduced by AOM 22 aids in discrimination with respect to light scattered by the various optical elements comprising system 10.

Test beam 20' is incident on a coated Brewster plate 24, which is oriented to transmit one polarization axis (e.g., vertically polarized) of the coherent light with approximately 100% efficiency and to reflect the transverse polarization axis (e.g., horizontally polarized light) with approximately 100% efficiency. Laser 12 and Brewster plate 24 are arranged to allow 100% transmission of the polarized coherent light exiting AOM 22, so that it is incident on a quarter-wavelength plate 26. Quarter-wavelength plate 26 has two optical axes that transmit light with a different characteristic velocity. The difference in the velocity for two linearly polarized light components with regard to the two axes of the quarter-wavelength plate converts test beam 20' from linear polarization into circular polarization of a predefined rotational direction, for example, having a counter-clockwise rotation or "right-hand" circular polarization. In FIGS. 1 (and 2), an arrow identified with the reference letter "P" is used to illustrate the polarization of light at different points in the apparatus.

As shown in the figures, the circularly polarized test beam is incident on a simple convex lens 28. Convex lens 28 is shown as a single simple element, but it is intended to graphically represent a potentially more complex optical system suitable for focusing the circularly polarized test beam on a target cell 30 having a desired volume substantially smaller than that expected to contain one aerosol particle in the fluid whose relative velocity is to be determined.

Light reflected from an aerosol particle in target cell 30 experiences a reversal in the sense of circular polarization. Thus, if the coherent light that was incident on an aerosol particle was right-hand circularly polarized, the light reflected from the aerosol particle in target cell 30 is left-hand circularly polarized. More importantly, the light reflected from an aerosol particle experiences a Doppler shift in frequency proportional to a component of the relative velocity of the aerosol particle that is directed along the path followed by the test beam incident on the aerosol particle. If the aerosol particle has a relative velocity component directed toward lens 28, the frequency of the light reflected from the aerosol particle, which comprises a reflected beam, is higher than that of the light incident on the aerosol particle in the test beam. Conversely, the frequency of the reflected beam is lower if the aerosol particle has a relative component of velocity in the opposite direction.

When passing back through quarter-wavelength plate 26 in the opposite direction, the circularly polarized light reflected from an aerosol particle comprising the reflected beam is converted to linearly polarized light-but linearly polarized in an orthogonal direction compared to test beam 20'. This linearly polarized light is reflected from Brewster plate 24 and travels along a path 32, toward another beam splitter 38. Beam splitter 38 is oriented to reflect approximately 99% of the linearly polarized reflected beam incident on it from quarter-wavelength plate 26, and to transmit the remaining 1%. Accordingly, most of the light traveling along path 32 is reflected toward a convex lens 42 along a path 40. Just as explained with regard to lens 28, convex lens 42 is shown as a single, simple element, but can be replaced with a more complex assembly of optical components suitable for focusing light on a photodetector 44.

Referring back to beam splitter 16, the linearly polarized light comprising reference beam 18 is directed toward an AOM 34, which shifts its frequency by an amount $\Delta F_2$ (preferably not equal to $\Delta F_1$), thereby discriminating against light scattering within either AOM 34 or AOM 22 onto the optic axis along which the light exits after being shifted in frequency by $\Delta F_1$ or $\Delta F_2$. A reference beam 18' exits AOM 34 and passes through a half-wavelength plate 36, which changes its linear polarization by 90 degrees, so that the linear polarization of the reference beam matches that of the reflected beam traveling along path 32. A relatively small portion (i.e., about one percent) of the light exiting half-wavelength plate 36 is transmitted by beam splitter 38. This remaining portion of the reference beam combines with light that was reflected by an aerosol particle traveling along path 40. Light that has experienced a Doppler shift due to reflection from an aerosol particle thus mixes with the light comprising reference beam 18', producing a time varying intensity or beat frequency. The mixing of the reference beam and the reflected beam produces a difference frequency as a function of the Doppler shift induced in the light reflected from the aerosol particle. Photodetector 44, which preferably comprises a PIN diode, produces an electrical signal having an amplitude that is indicative of the incident light intensity of the difference signal. Details of the signal processing applied to the electrical signal produced by photodetector 44 to determine the relative velocity of the aerosol particle and the air or other fluid in which the particle is entrained are discussed below.

Figure 2:
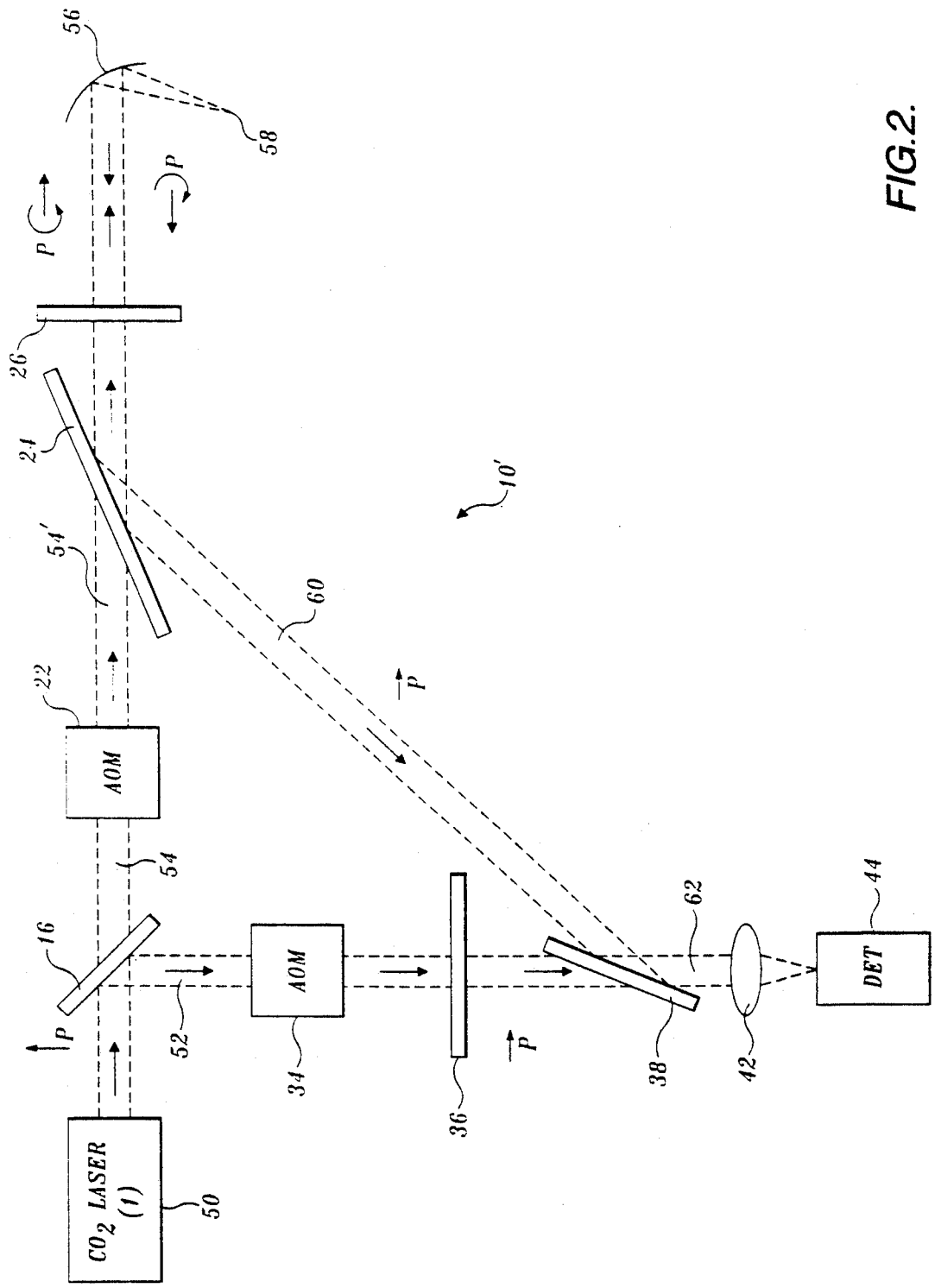
FIG. 2 is a schematic diagram showing a second embodiment of the CW Doppler LIDAR system.
Figure 3:
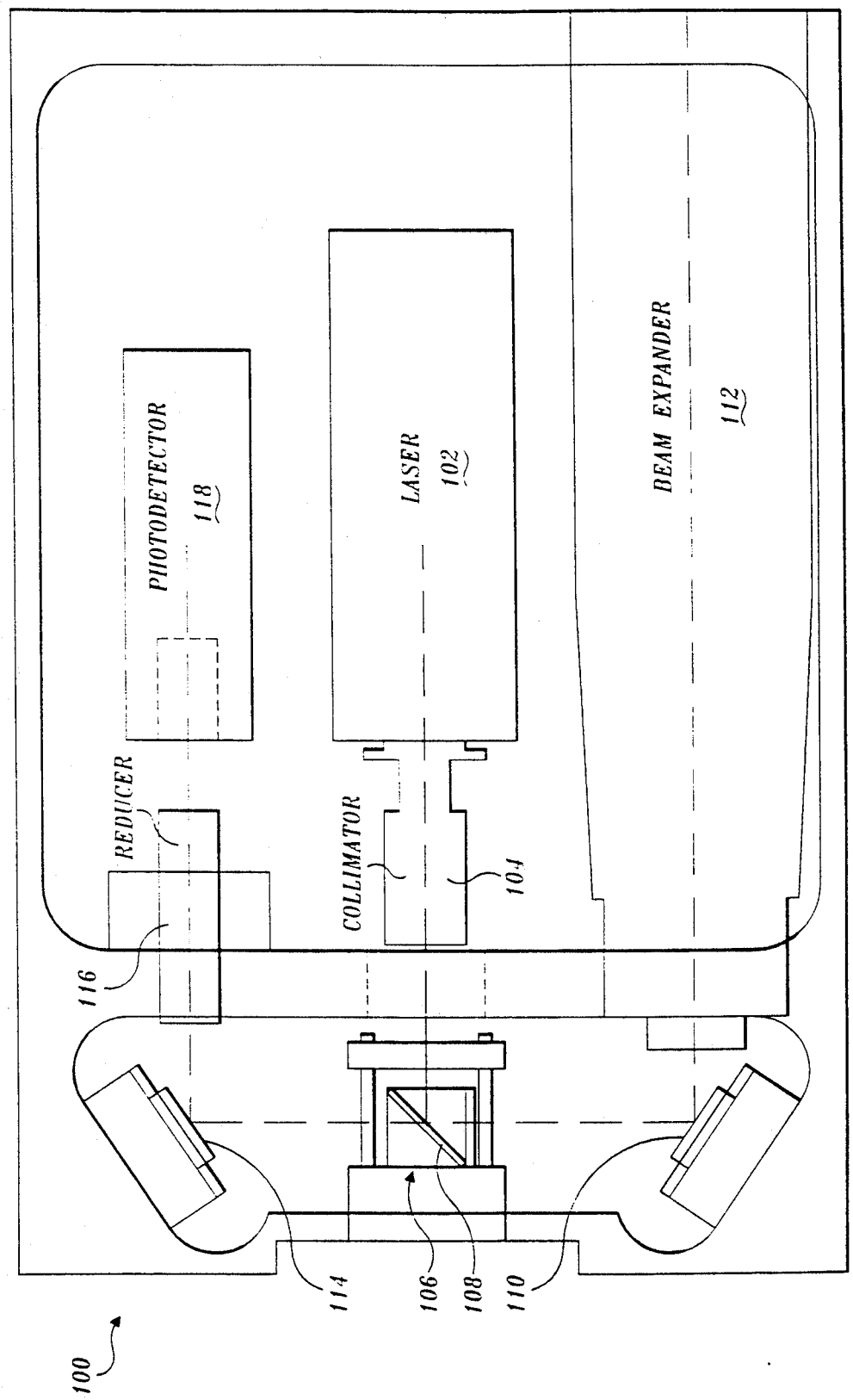
FIG. 3 is a plan view of a third embodiment of the CW Doppler LIDAR system.

With reference to FIG. 2, a second embodiment of the present CW Doppler LIDAR system is shown generally at reference numeral 10'. In this second embodiment, many of the same components are used as in the first embodiment and therefore have the same reference number. One element that is different is the source of coherent light. A carbon dioxide ($CO_2$) laser 50 produces the coherent light that is split into a test beam 54 and a reference beam 52. The test beam travels through AOM 22, exits as a test beam 54' that passes through Brewster plate 24, and quarter-wave plate 26, and is affected by each of these elements just as in the first embodiment. However, the circularly polarized light from quarter-wavelength plate 26 is reflected through approximately a 90-degree angle by an off-axis parabolic mirror 56, toward a target cell 58 that is disposed off the axis of test beam 54. Light reflected from any aerosol particle passing through target cell 58 comprises a reflected beam that travels back toward parabolic lens 56 in the opposite direction from the test beam. Thereafter, the reflected beam travels back toward beam splitter 38 along a path 60, and then in combination with the reference beam 52, travels along a path 62 toward lens 42. Accordingly, CW Doppler LIDAR system 10' can be used to determine the velocity of an aerosol particle having a velocity component directed along the focal axis of off-axis parabolic mirror 56, as a function of the Doppler shift in the frequency of the light reflected from the aerosol particle.

A third embodiment of the present invention is shown in FIG. 3. Unlike the first two embodiments, which were generally built from components mounted on an optical bench, the third embodiment is configured with components mounted in channels machined from a block of aluminum 100. Aluminum block 100 thus serves as an integral framework to support the various components comprising this embodiment of the CW Doppler LIDAR system. A neodymium YAG laser 102 having a rated power of 150 milliwatts is disposed at the center of aluminum block 100. The coherent linearly polarized light produced by laser 102 is expanded by a 2× collimator 104, and the collimated beam is directed toward a beam splitter 106 having an attached quarter-wavelength plate 108. Approximately 96% of the light entering beam splitter 106 comprises a test beam that is reflected toward a mirror 110, which is angled at 45°. The remaining 4% of the light reflected from a front surface of quarter-wavelength plate 108 passes back through the quarter-wavelength plate and emerges with a linear polarization orthogonal to the linear polarization of the light initially emitted by laser 102; this light, comprising a reference beam, is directed toward a mirror 114. The test beam directed toward mirror 110 is circularly polarized by quarter-wavelength plate 108 with, for example, a right-hand direction of rotation. The test beam is reflected by mirror 110 into the entrance of a beam expander 112, which expands the light and collimates it so that the test beam exiting the beam expander is approximately 33 times larger in diameter than at its point of entry into the beam expander. On the right-hand side of beam expander 112 is a lens (not shown) that focuses the beam upon a target cell (also not shown, but equivalent to target cell 30 in the first two embodiments) having a relatively small sensing volume and disposed at a focal length ranging from 50 centimeters to 2.5 meters. Any aerosol particle traveling through the target cell reflects the circularly polarized coherent light, changing its direction of circular polarization rotation and causing a Doppler shift in its frequency as a function of the velocity of the aerosol particle (or at the least the component of the relative velocity aligned with the direction of propagation of the circularly polarized light beam).

The light reflected from the aerosol particle comprises a reflected beam that re-enters beam expander 112. However, the beam expander now focuses the reflected beam toward mirror 110, reducing its diameter by a factor of 33 and collimating the light. The light comprising the reflected beam reflects from mirror 110 back toward beam splitter 106, passes through quarter-wavelength plate 108 and beam splitter 106, and travels on toward mirror 114.

The 4% of the coherent light emitted by laser 102 comprising the reference beam that is initially directed toward mirror 114 is reflected by mirror 114 into a beam reducer 116. The light that was reflected from the aerosol particle, which comprises the reflected beam, also strikes mirror 114 and is reflected thereby into beam reducer 116. Beam reducer 116 focuses the light passing through it (the combined reflected beam and reference beam) onto a photodetector 118. In this preferred embodiment, photodetector 118 comprises an indium gallinium arsenide PIN diode. Photodetector 118 produces an electrical signal corresponding in amplitude to the varying intensity of the incident light that defines the interference pattern resulting the mixing of the reference beam and the reflected beam. The frequency of this electrical signal is thus a function of the difference in the frequencies of these two light signals caused by the Doppler shift, which is due to the relative velocity of the aerosol particle.

Figure 4:
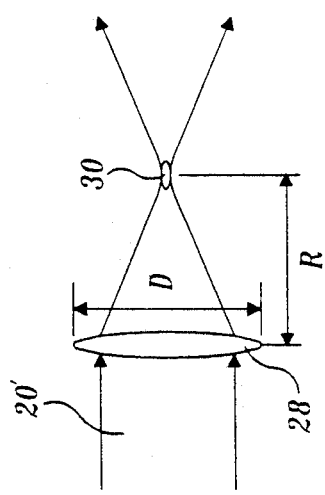
FIG. 4 is a graphic representation of the CW Doppler LIDAR beam focused on a detection cell.
Figure 5:
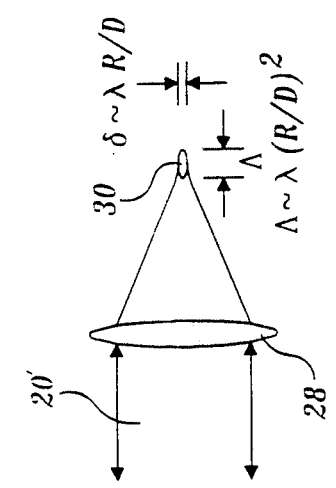
FIG. 5 is a graphic representation of the CW Doppler LIDAR beam reflected from an aerosol particle in the detection cell.

Turning to FIGS. 4 and 5, details of target cell 30 are shown to facilitate understanding of how the present CW Doppler LIDAR system improves the SNR with which the relative velocity of a fluid is measured, compared to conventional LIDAR systems. Lens 28 (or other suitable optical components used to focus the light) has a nominal optical diameter D and a focal length R. Thus, R/D equals the effective f-stop of lens 28. The diameter, $\delta$, of target cell 30 is therefore approximately defined by:

$$\delta \sim \lambda \bullet R/D, \text{ or}$$

$$\delta \sim \lambda \bullet f \quad (2)$$

Furthermore, the length, $\Lambda$, of target cell 30 is approximately defined by:

$$\Lambda \sim \lambda \bullet (R/D)^2, \text{ or}$$

$$\Lambda \sim \lambda \bullet f^2 \quad (3)$$

Accordingly, the volume, V, of target cell 30 is approximately defined by:

$$V \sim \lambda^3 \bullet f^4 \quad (4)$$

Using coherent light having a 1 micrometer wavelength focused in a test beam at a range of 1 meter, with an optical diameter of 3 centimeters, a sensed volume of about $4.5 \times 10^{-5}$ centimeters cubed is provided. Any time an aerosol particle (e.g., a moisture droplet) passes through target cell 30, it reflects light back toward lens 28 as the reflected beam. The present CW Doppler LIDAR system has a substantially improved SNR in part because the sensed volume of target cell 30 is generally much smaller than that expected to contain a single aerosol particle within the fluid. The same advantage applies when the coherent light reflects from a dust mote or other particulate matter entrained within the fluid whose relative velocity is being monitored.

For circularly polarized light having a wavelength equal to approximately 0.5 micrometers, the measured scattering extinction coefficient of CW Doppler LIDAR system 10 is generally greater than $10^{-5}$ per meter, and this extinction coefficient is primarily due to particles having diameters in the range of from 0.3 to 1.0 micrometer. Assuming an extinction coefficient of $10^{-5}$ per meter for particles of 0.3 to 1.0 micrometer diameter, the calculated particle concentration in terms of the number of particles per volume of air or other fluid is $8 \times 10^6$ per cubic meter for particles having a 1 micrometer diameter and $70 \times 10^6$ per cubic meter for particles having a 0.3 micrometer diameter. Using the calculated size of the sensed volume ($4.5 \times 10^{-5}$ cubic centimeters) and assuming a particle concentration of $10^7$ per cubic meter, the signal produced by light reflected from particles passing through target cell 30 is enhanced by a factor of $2.2 \times 10^3$ during the relatively short time that one particle is within the sensed volume of target cell 30. The majority of the time, no light is reflected from within target cell 30, since no particle is present to reflect the light.

The minimum scattering signal that can be produced by aerosol particles is that resulting from one particle passing through the sensed volume of the target cell, since the scattering signal is absent when no particle is within the sensed volume of the target cell. As the particle concentration in air (or other fluid) decreases, the peak value of the signal does not decrease below this minimum value. Instead, only the portion of time during which the signal is present becomes smaller.

As shown in FIG. 5, each time that a particle passes through target cell 30, light comprising test beam 20' is reflected from the particle and experiences a Doppler shift, based upon the relative velocity component of the particle in the direction that the light is propagating. If fluid velocity is directed at an angle to the direction in which the test beam is propagating, only the component of the velocity aligned with the light beam contributes to the Doppler shift.

Figure 6:
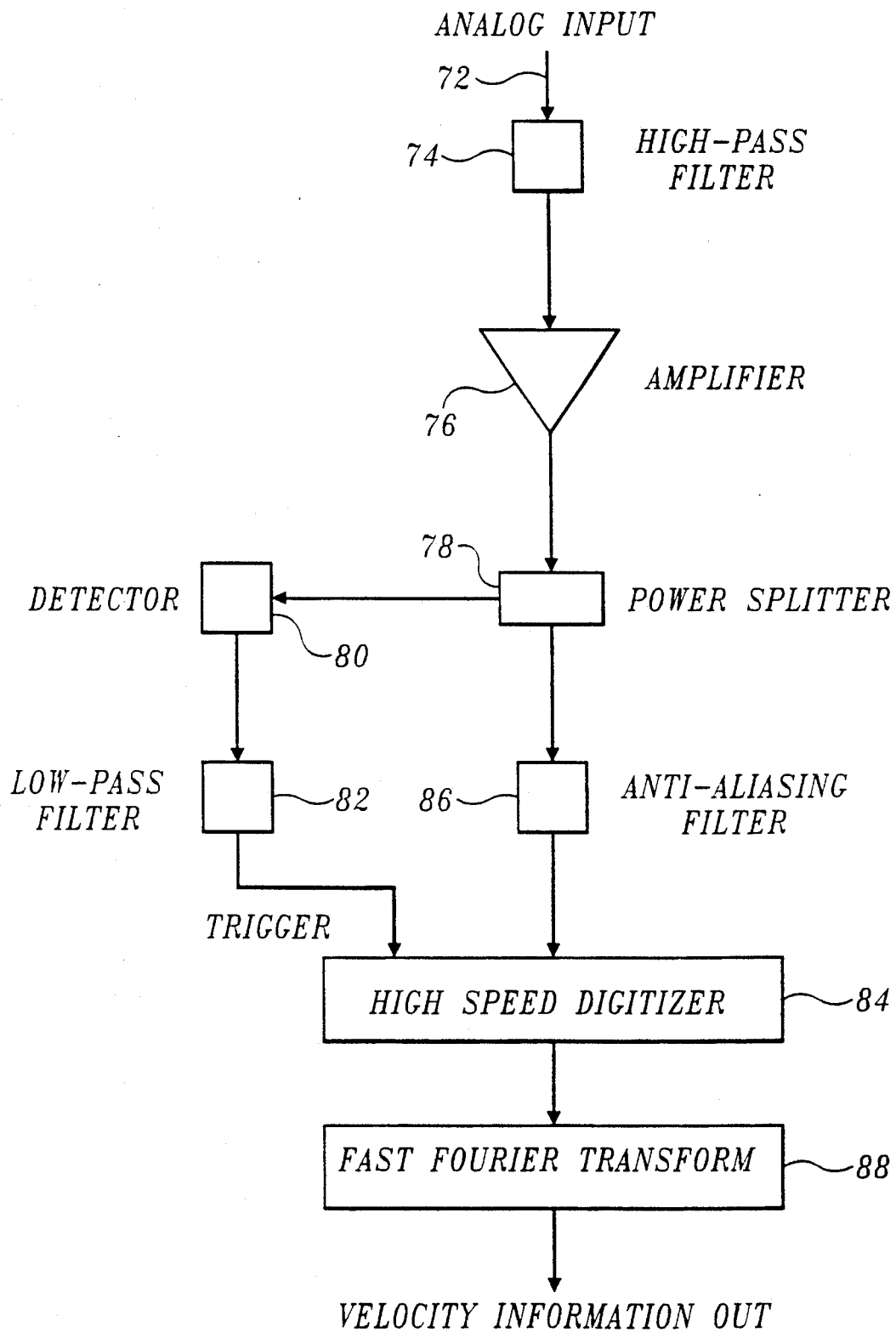
FIG. 6 is a block diagram showing the signal processor used to process an analog output signal produced in response to an aerosol particle moving through the detection cell in the present invention.

Mixing of the reference and reflected light beams incident upon either photodetector 44 in the first and second embodiment or photodetector 118 in the third embodiment produces an analog electrical signal having a difference frequency ranging between 5 MHz and 500 MHz (the upper frequency and thus the maximum relative fluid velocity that can be determined being limited only by the capacity of the signal processing components described below). As shown in FIG. 6, a lead 72 conveys the analog electrical signal from the photodetector to the input of a high pass filter 74, generally designed to pass electrical signals having a frequency in excess of 2 MHz. High pass filter 74 thus blocks any lower frequency relaxation signals that are produced by the laser source, which tend to modulate the analog signal at a lower frequency than the difference frequency resulting from mixing of the reflected and reference light beams. A wide band amplifier 76 amplifies this filtered signal by approximately 50 dB. However, even after being amplified by wide band amplifier 76, the voltage of the amplified signal is less than one volt.

A commercially available power splitter 78 splits off a portion of the amplified signal, applying it to a detector 80. The remainder of the amplified signal is applied to the input of an anti-aliasing filter 86, eliminating higher-order harmonics that would otherwise interfere with a subsequent Fourier analysis of the signal. The output of the anti-aliasing filter is applied to the input of a high speed digitizer 84, and its digital output is connected to the input of a fast Fourier transform processor 88. The purpose of the fast Fourier processor is explained below, following a discussion of detector 80.

Detector 80 comprises a full wave rectifier, which produces a full-wave rectified, direct current (DC) pulse signal that is input to a low pass filter 82. Low pass filter 82 is designed to filter out signals having a frequency in excess of approximately 1 MHz, thereby eliminating any high frequency modulation and white noise that are present in the rectified signal. The output signal developed by low pass filter 82 represents a level detection trigger signal that is applied to control high speed digitizer 84. This level detection trigger signal is an enabling signal that controls the operation of high speed digitizer 84, determining whether the signal applied to the input of the high speed digitizer from antialiasing filter 86 is digitized. Because high speed digitizer 84 is triggered into operation by the level detection trigger signal when the amplitude of the signal is above a predefined minimum, it only digitizes the wave form input to it at the time that a difference frequency signal resulting from mixing of the reflected beam and reference beam occurs. Thus, the input of fast Fourier transform processor 88 only receives a signal from the output of high speed digitizer at times when a reflection from a particle has produced a reflected beam. Fast Fourier transform processor 88 converts the time domain information in this digital input signal to a frequency domain, wherein a peak energy is evident at the frequency of the Doppler shift caused by the particle's relative velocity. The frequency of the peak energy in the frequency domain therefore in indicative of the relative velocity of the particle (and thus the velocity of the fluid in which the particle is suspended).

A primary benefit of the CW Doppler LIDAR system in accordance with the present invention is the substantial increase in SNR, which it yields. Because the relative volume of target cell 30 is so small that generally only one particle at a time interacts with the coherent light focused on the target cell, the ratio of the volume per particle to the sensed volume of target cell 30 causes a substantial enhancement of the SNR. A conventional CW Doppler LIDAR system has an SNR, as defined above in the Background of the Invention by Equation 1.

Figure 7:
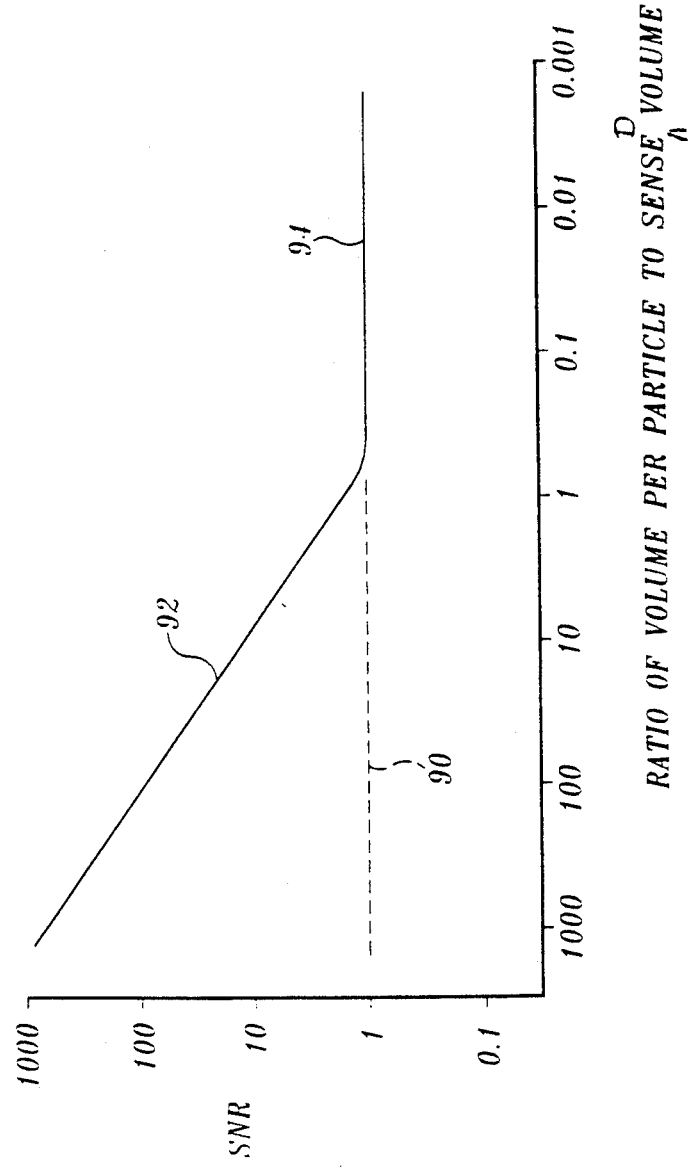
FIG. 7 is a graph of both average and peak SNR with respect to a volume ratio (the volume per particle relative to the detection cell volume)

The SNR predicted by Equation 1 is also applicable to the present invention; however, in the present invention, the value developed by the equation represents an average of the zero value SNR (existing during the fraction of time that the sensed volume of the target cell contains no particles) and the enhanced SNR (existing during the time that the sensed volume contains one particle). In FIG. 7, this average SNR that applies to prior art LIDAR systems is indicated by a dash line 90, which extends from the relatively flat portion of an SNR curve 94. The enhanced SNR of the present invention occurs when the volume of the target cell contains one particle. The high intensity coherent light focused on the small volume comprising the target cell produces a large scattering signal during that fraction of the time that a particle is within target cell 30.

To achieve the advantage of the enhanced SNR that occurs when a particle is within the small volume target cell, the detector circuit shown in FIG. 6 is enabled for signal processing only during the period of time when the SNR is enhanced. The level detection trigger signal described above enables high speed digitizer 84 (FIG. 6) only during that time. As a result, the applicable SNR of the present invention is NOT the average SNR represented by dash line 90 in FIG. 7. Only the enhanced SNR applies in the present invention, and it is approximately $10^3$ times greater than the SNR of a conventional CW Doppler LIDAR system.

Figure 8:
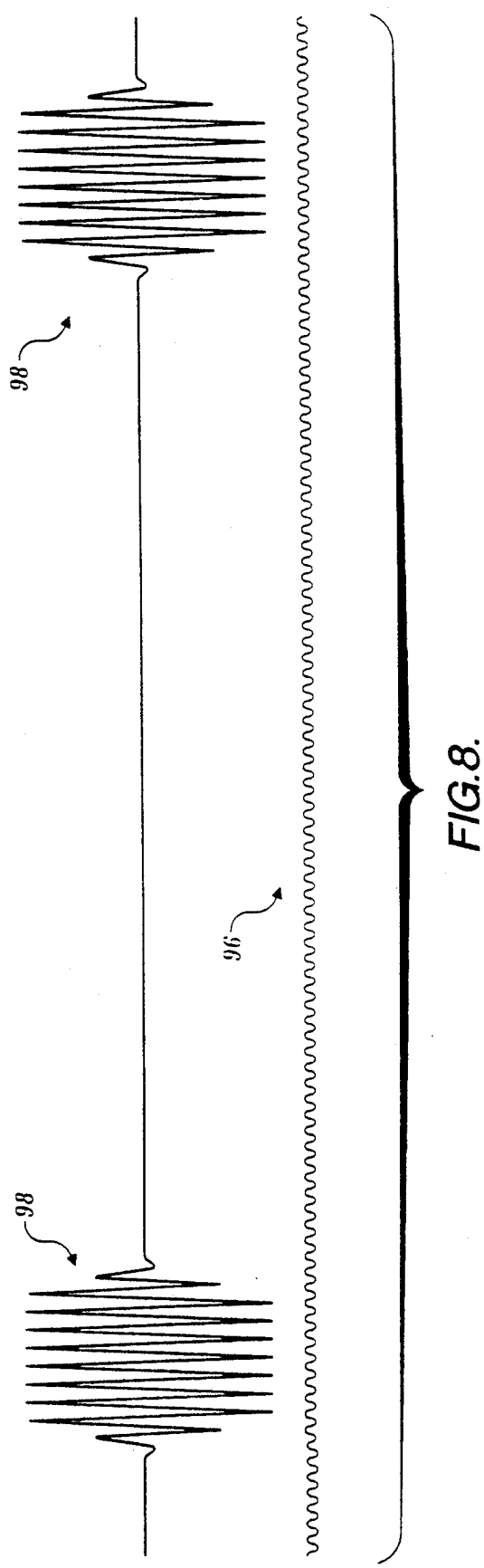
FIG. 8 is a graph showing the LIDAR output signal amplitude (due to reflection from an aerosol particle) for both a system in accord with the present invention and a conventional LIDAR system.

FIG. 8 illustrates the advantage of the analog electrical signal produced by the photodetectors comprising the preferred embodiments of the present invention, compared to a conventional CW Doppler LIDAR system signal. In FIG. 8, the upper trace illustrates two sets of difference signals 98, resulting from mixing the reference beam with the Doppler-shifted reflected beams produced by two particles crossing the sensed volume, i.e., passing through target cell 30 at two different times. A lower trace 96 represents the signal from a conventional CW Doppler LIDAR system with a backscatter coefficient equal to that of the present invention. The enhanced SNR produces difference signals 98 having an amplitude enhanced by more than twenty times that of trace 96. Consequently, the present invention is much more effective in monitoring fluid flow than the prior art LIDAR systems.

While several preferred embodiments of the present invention have been illustrated and described, it will be appreciated that various changes can be made therein without departing from the spirit and scope of the invention. Accordingly, it is not intended that the scope of the present invention be in any way limited by the description of the preferred embodiments, but instead, be entirely determined by reference to the claims that follow.

The invention in which an exclusive property or privilege is claimed is defined as follows:

1. A method for measuring a relative velocity with respect to a fluid containing particles, comprising the steps of:
    a. focusing coherent light on a volume of space comprising a detection cell, the detection cell being exposed to the fluid containing particles so that when one of the particles passes through the detection cell, it reflects the coherent light and causes a Doppler shift in the frequency of the coherent light that is reflected due to the relative velocity of the particle, the detection cell having a volume that is substantially less than an average volume per particle in the fluid;
    b. forming a reference beam from a portion of the coherent light that is not focused on the detection cell;
    c. combining the reference beam with the coherent light reflected from the particle passing through the detection cell, forming a combined light signal;
    d. monitoring a coherent intensity of the combined light signal, producing a corresponding electrical signal; and
    e. processing the electrical signal to determine the Doppler shift of the coherent light reflected from the particle, and as a function of the Doppler shift, determining the relative velocity of the particles and the fluid.

2. The method of claim 1, wherein the step of processing includes the step of detecting a level of the electrical signal to produce a signal that controls the processing of the electrical signal, inhibiting the processing unless one of the particles is within the detection cell.

3. The method of claim 1, wherein the step of forming the reference beam comprises the step of splitting the coherent light between the reference beam and a portion that is focused on the detection cell.

4. The method of claim 1, further comprising the step of shifting the frequency of the coherent light focused upon the detection cell to a first frequency and shifting the frequency of the reference beam to a second frequency different from the first frequency.

5. The method of claim 1, further comprising the steps of circularly polarizing the light focused on the detection cell; and rotating a linear polarization of the reference beam prior to mixing it with the light reflected from the particle.

6. The method of claim 1, wherein the step of processing comprises the steps of digitizing the electrical signal to produce a digital signal, and Fourier transforming the digital signal to produce a signal having an energy level that peaks at the Doppler shift in the frequency of the coherent light reflected from the particle, caused by the relative velocity of the particle.

7. The method of claim 1, wherein the coherent light is focused to define the detection cell with a volume small enough so that it only occasionally contains a particle that reflects the coherent light.

8. Apparatus for sensing a relative velocity of a fluid containing particles, comprising:
   a. means for producing coherent light, including a test beam and a reference beam;
   b. a lens for focusing the test beam at a region of space comprising a detection cell, having a volume sufficiently small that the volume is empty most of the time and contains only one particle the remainder of the time, any particle passing through the detection cell reflecting the coherent light as a reflected beam, the reflected beam experiencing a change in frequency due to a Doppler shift caused by the relative velocity of the particle;
   c. means for combining the reflected beam with the reference beam so that they interfere with each other;
   d. a detector for monitoring the intensity of the light comprising the combined reflected beam and reference beam, producing a corresponding electrical signal; and
   e. processing means for processing the electrical signal to determine the frequency shift of the reflected light caused by its Doppler shift due to the relative velocity of the particle, and as a function thereof, the relative velocity of the particle and the fluid.

9. The apparatus of claim 8, wherein the means for producing coherent light comprise a laser and a splitter that is disposed in an optical path so as to intercept coherent light output from the laser, directing a portion comprising the reference beam along a different optical path.

10. The apparatus of claim 8, further comprising means for shifting the frequency of the test beam to a first value and of the reference beam to a second value, different from the first value.

11. The apparatus of claim 8, further comprising means for modifying a polarization characteristic of the reference beam so it is the same as that of the reflected beam.

12. The apparatus of claim 8, wherein the lens focuses the test beam so that the volume of the detection cell is substantially less than an average volume per particle of the fluid, insuring that the test beam is not reflected from a particle most of the time and is only reflected from one particle the remainder of the time.

13. The apparatus of claim 8, wherein the means for combining the reflected beam with the reference beam comprises a beam splitter that transmits substantially all of one of the reference beam and the reflected beam, but reflects substantially all of the other of the reference beam and the reflected beam along a common path.

14. The apparatus of claim 8, wherein the processing means comprise an analog-to-digital convertor that digitizes the electrical signal produced by the detector, producing a digitized signal corresponding thereto.

15. The apparatus of claim 14, wherein the processing means further comprise level detection means for controlling the processing of the electrical signal, inhibiting the processing when a level of the electrical signal is below a predetermined value, which occurs when one of the particles in not reflecting the test beam.

16. The apparatus of claim 15, wherein the processing means further comprise a Fourier transform processor connected to convert the digitized signal from a time domain to a frequency domain, an output of the Fourier transform processor representing energy as a function of frequency of the digitized signal, the frequency of an energy peak in the frequency domain indicating the Doppler shift of the test beam by one of the particles being used to determine the relative velocity of the particle and of the fluid.

* * * * *